United States Patent
Ishimaru

(10) Patent No.: US 9,710,062 B2
(45) Date of Patent: Jul. 18, 2017

(54) ELECTRONIC APPARATUS AND METHOD FOR CONTROLLING ELECTRONIC APPARATUS TO PROVIDE TACTILE SENSATION FEEDBACK

(71) Applicant: CANON KABUSHIKI KAISHA, Tokyo (JP)

(72) Inventor: Satoshi Ishimaru, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 377 days.

(21) Appl. No.: 14/031,440

(22) Filed: Sep. 19, 2013

(65) Prior Publication Data

US 2014/0089791 A1    Mar. 27, 2014

(30) Foreign Application Priority Data

Sep. 21, 2012 (JP) .................................. 2012-208711

(51) Int. Cl.
*G06F 3/01* (2006.01)
*G06F 3/0484* (2013.01)
*G06F 3/041* (2006.01)

(52) U.S. Cl.
CPC ............ *G06F 3/016* (2013.01); *G06F 3/0416* (2013.01); *G06F 3/0484* (2013.01); *G06F 2203/04809* (2013.01)

(58) Field of Classification Search
CPC .......... G06F 3/016; G06F 3/14; G06F 9/4443; G11B 27/34; G11B 27/034; G09B 21/003
USPC .................................................. 715/702, 972
See application file for complete search history.

(56) References Cited

U.S. PATENT DOCUMENTS

| | | | | |
|---|---|---|---|---|
| 6,125,385 A | * | 9/2000 | Wies ........................ | G06F 3/016 345/163 |
| 6,161,126 A | * | 12/2000 | Wies ....................... | G05B 19/00 709/203 |
| 7,039,866 B1 | * | 5/2006 | Rosenberg ............. | B25J 9/1689 345/156 |
| 7,159,008 B1 | * | 1/2007 | Wies ........................ | G06F 3/01 709/203 |
| 8,621,348 B2 | * | 12/2013 | Ramsay ................ | G06F 1/1626 715/702 |
| 2003/0068053 A1 | * | 4/2003 | Chu ........................ | G06F 3/016 381/118 |
| 2004/0246841 A1 | * | 12/2004 | Miyamoto ............. | G11B 20/10 369/47.28 |

(Continued)

FOREIGN PATENT DOCUMENTS

| CN | 101616213 A | 12/2009 |
|---|---|---|
| CN | 102043465 A | 5/2011 |

(Continued)

*Primary Examiner* — Joy Weber
(74) *Attorney, Agent, or Firm* — Canon U.S.A., Inc. IP Division

(57) ABSTRACT

A setting item for specifying a setting detail to be set is displayed on a setting screen for making a setting about contents. A content item representing the content is displayed on a content screen for displaying the content. An object touching the setting item on the setting screen is given a tactile sensation according to the touched setting item. The object touching the content item on the content screen is given the same tactile sensation as that given when the setting item for specifying the setting detail set for the touched contents is touched.

19 Claims, 13 Drawing Sheets

(56) References Cited

U.S. PATENT DOCUMENTS

| | | | | |
|---|---|---|---|---|
| 2009/0069081 A1* | 3/2009 | Thorner | ............ | A63F 13/02 |
| | | | | 463/30 |
| 2009/0167508 A1* | 7/2009 | Fadell | ............ | G06F 3/016 |
| | | | | 340/407.2 |
| 2009/0267921 A1* | 10/2009 | Pryor | ............ | B60K 35/00 |
| | | | | 345/177 |
| 2009/0289779 A1* | 11/2009 | Braun | ............ | G06F 3/016 |
| | | | | 340/407.2 |
| 2009/0322498 A1* | 12/2009 | Yun | ............ | G06F 3/016 |
| | | | | 340/407.2 |
| 2012/0009896 A1* | 1/2012 | Bandyopadhyay | ... | G06F 1/1643 |
| | | | | 455/411 |
| 2012/0327006 A1* | 12/2012 | Israr | ............ | G06F 3/044 |
| | | | | 345/173 |

FOREIGN PATENT DOCUMENTS

| | | |
|---|---|---|
| CN | 102067068 A | 5/2011 |
| JP | 2005-031918 A | 2/2005 |
| JP | 2009-87359 A | 4/2009 |
| JP | 2012-520137 A | 9/2012 |

\* cited by examiner

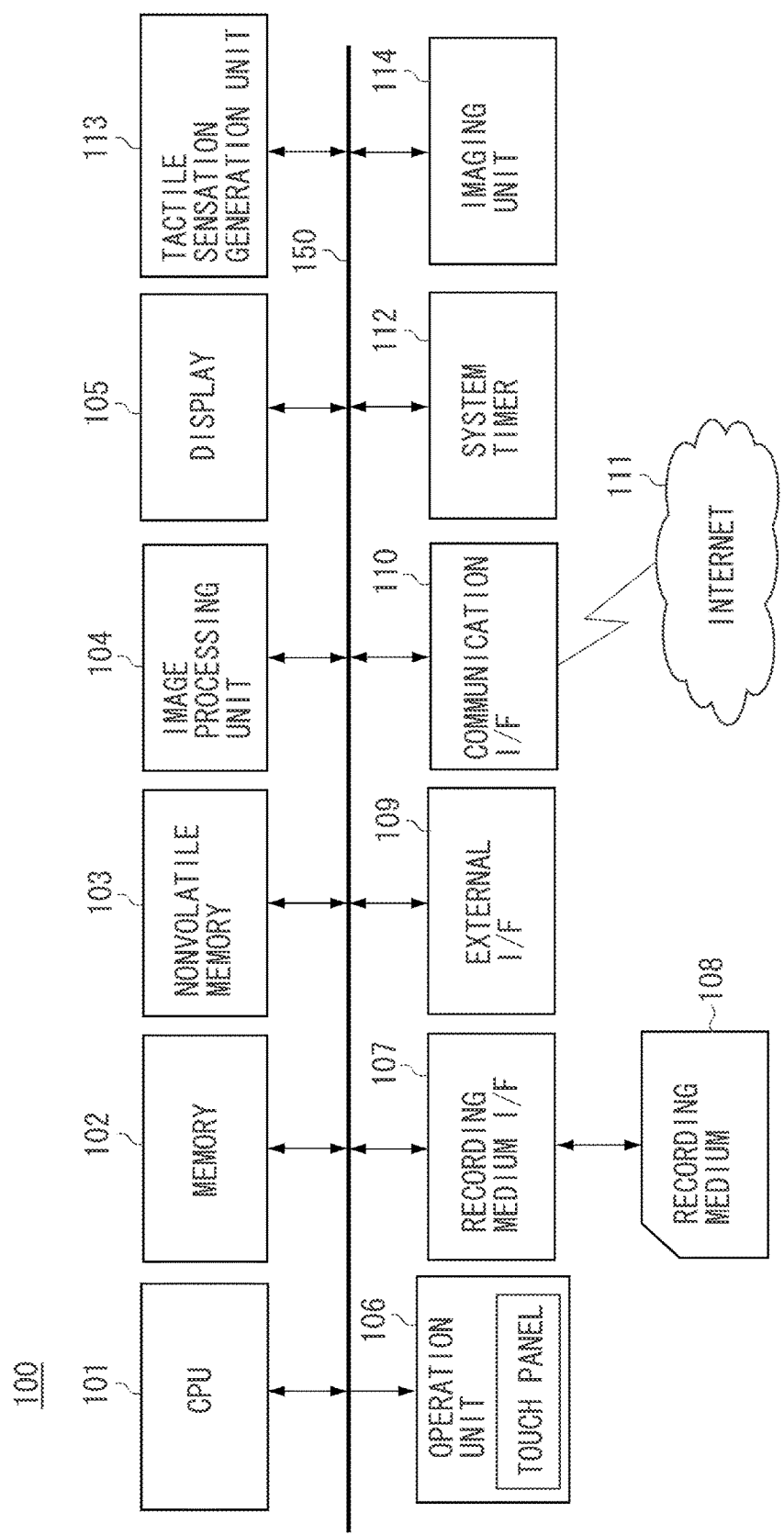

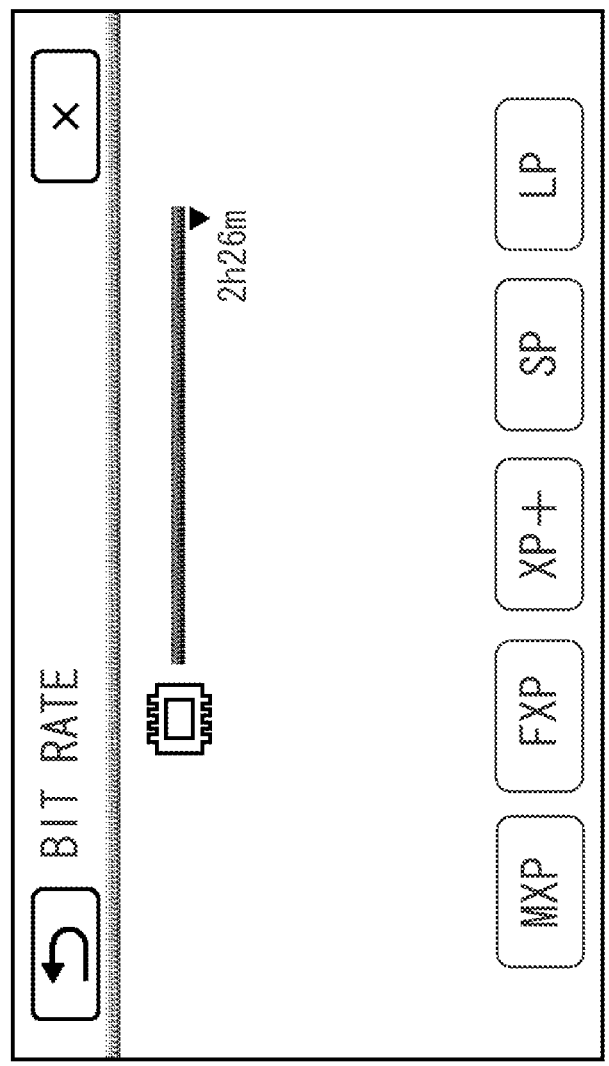

FIG. 2B

| BIT RATE | TACTILE SENSATION TYPE |
|---|---|
| MXP | SMOOTH SENSATION (HIGH) |
| FXP | SMOOTH SENSATION (LOW) |
| XP+ | NO TACTILE SENSATIONS |
| SP | GRAINY SENSATION (LOW) |
| LP | GRAINY SENSATION (HIGH) |

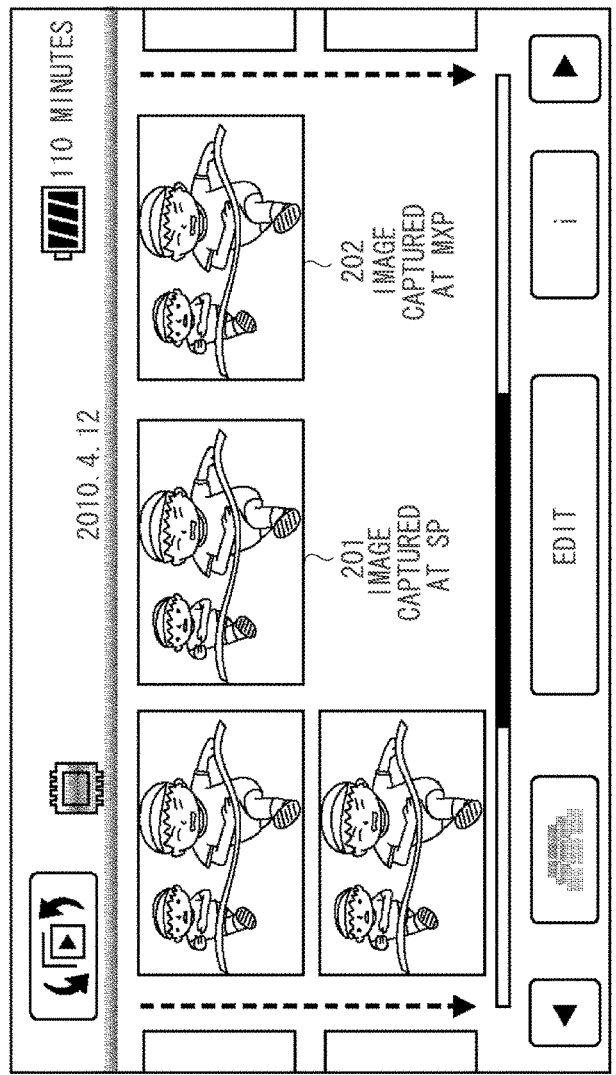

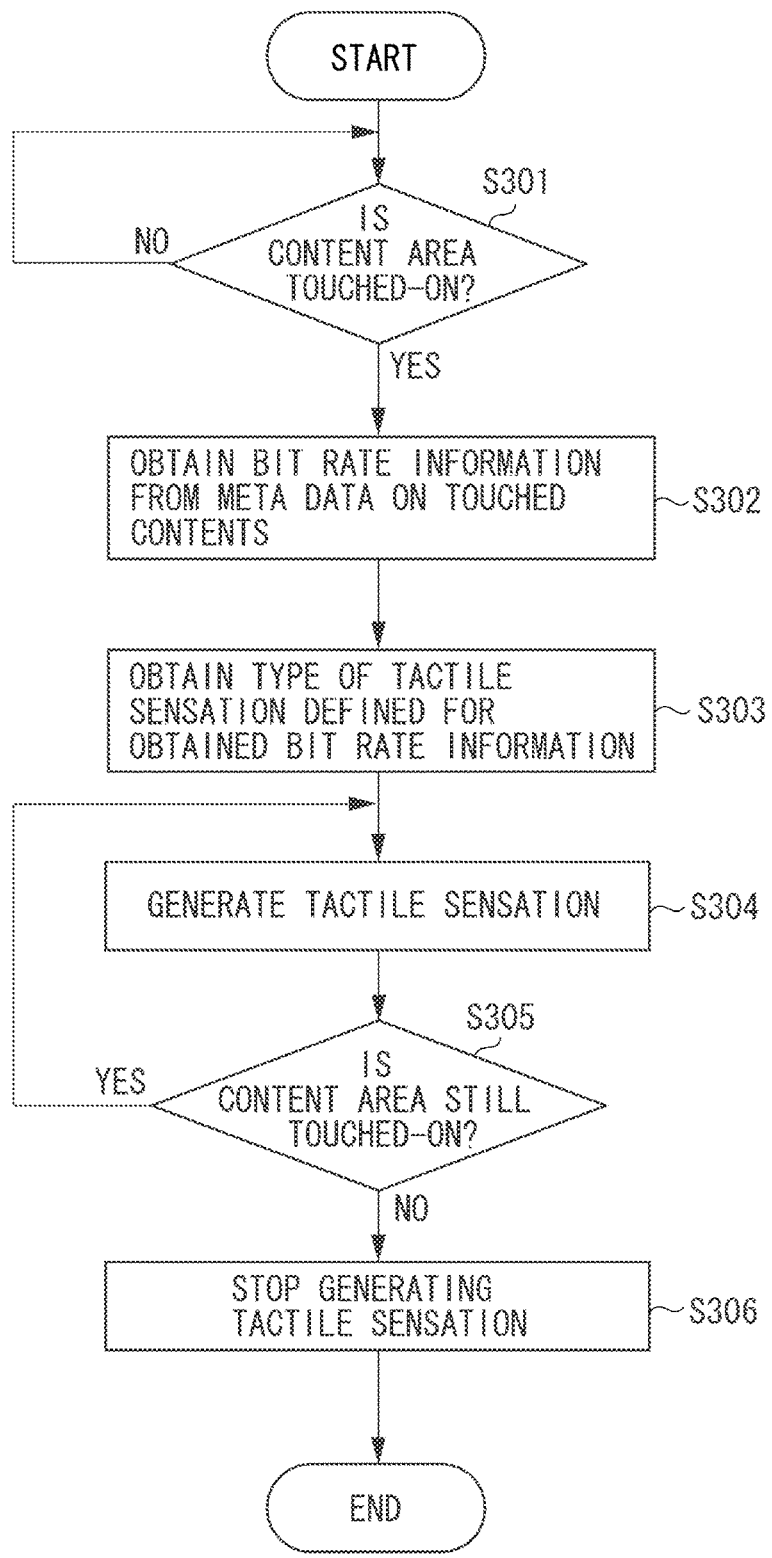

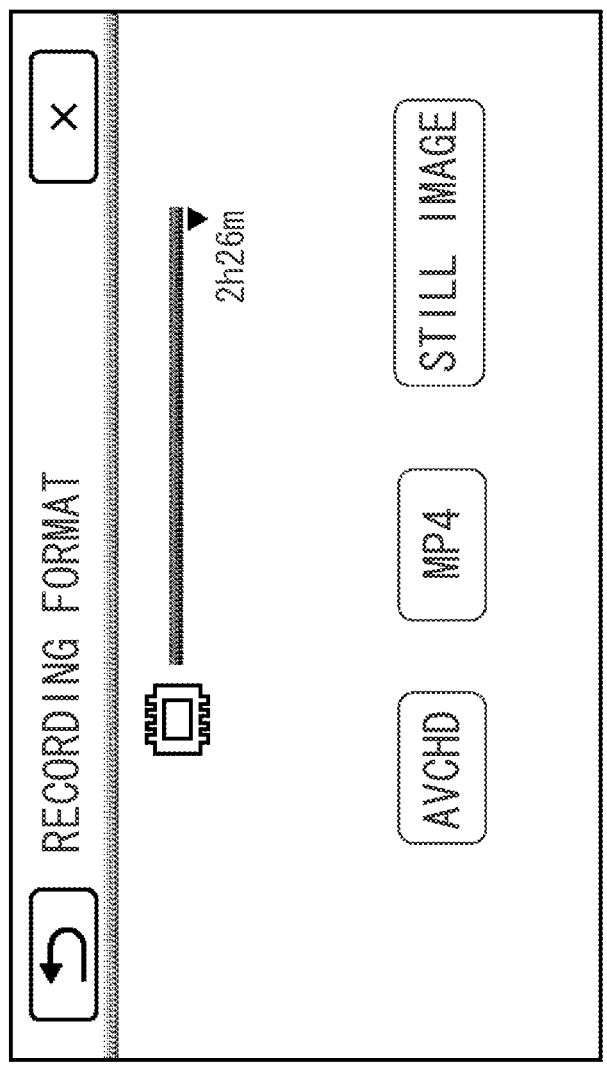

FIG. 4B

| RECORDING FORMAT | TACTILE SENSATION TYPE |
|---|---|
| AVCHD | SMOOTH SENSATION |
| MP4 | NO TACTILE SENSATION |
| STILL IMAGE | GRAINY SENSATION |

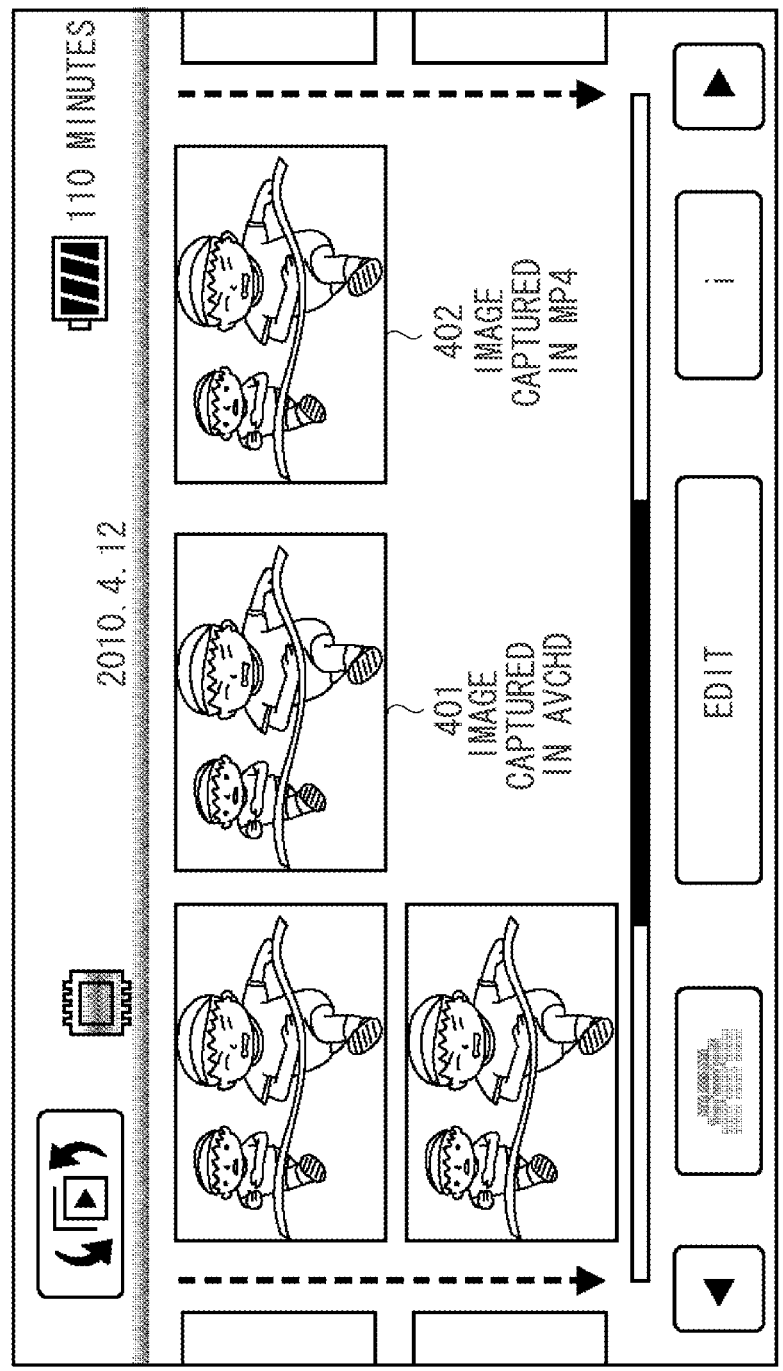

FIG. 6B

| GPS SETTING | TACTILE SENSATION TYPE |
|---|---|
| ON | NO TACTILE SENSATIONS |
| OFF | GRAINY SENSATION |

ELECTRONIC APPARATUS AND METHOD FOR CONTROLLING ELECTRONIC APPARATUS TO PROVIDE TACTILE SENSATION FEEDBACK

BACKGROUND OF THE INVENTION

Field of the Invention

The present disclosure generally relates to electronics and, more particularly, to an electronic apparatus and a method for controlling an electronic apparatus, and, for example, to a technique suitably usable for an electronic apparatus using a tactile sensation touch panel.

Description of the Related Art

With the proliferation of touch panels, touch panel-equipped electronic apparatuses such as digital cameras and smartphones have been increasing. The touch panel-equipped electronic apparatuses pursue intuitive user operation, so that operations of the electronic apparatuses have been realized by tap operations and flick operations. Japanese Patent Application Laid-Open No. 2009-87359 discusses a tactile sensation feedback method that gives an electrosensory stimulus according to an operation on a touch panel.

Specifically, charge intensities (voltages) and widths (frequencies) may be combined in various patterns to recreate tactile sensations to be expressed. Such patterns are sent to a control module to apply charge onto a film. When the user touches the charged film with a finger, the fingertip undergoes weak electrostatic forces, which are conveyed as uneven tactile sensations to the user's fingertip.

Tactile sensations may be given according to an operation on the touch panel. In such a case, the user cannot recognize the meaning of the tactile sensations he/she felt when touching content because the correspondence between setting items and the tactile sensations are unknown. Since the user cannot recognize the details of the meta data on the content from the tactile sensations, there is the problem that the meaning of the given tactile sensations is difficult for the user to understand.

SUMMARY OF THE INVENTION

The present disclosure is directed to giving content the same type of tactile sensation as that of a setting item.

According to an aspect of the present disclosure, an electronic apparatus includes a touch detection unit configured to detect a touch on a display unit, a tactile sensation generation unit configured to generate tactile sensations to be given to an object touching the display unit, a display control unit configured to control the display unit to display a setting item for specifying a setting detail to be set on a setting screen for making a setting about content, and display a content item representing the content on a content screen for displaying the content, and a control unit configured to control the tactile sensation generation unit to give the object touching the setting item on the setting screen a tactile sensation according to the touched setting item, and give the object touching the content item on the content screen the same tactile sensation as that given when the setting item for specifying the setting detail set for the touched content is touched.

According to the present disclosure, the user touching the content is given the same type of tactile sensation as that of the setting item. This facilitates the user recognizing the meaning of the given tactile sensation.

Further features and aspects of the present disclosure will become apparent from the following description of exemplary embodiments with reference to the attached drawings.

BRIEF DESCRIPTION OF THE DRAWINGS

FIG. 1 is a block diagram illustrating a general configuration of an electronic apparatus to which an exemplary embodiment of the present disclosure is applied.

FIG. 2A illustrates a display example of a screen for selecting a bit rate to be used in an image capturing operation.

FIG. 2B illustrates information about correspondence between bit rates and tactile sensations.

FIG. 2C illustrates a display example of a screen that displays captured images in a list in a playback mode.

FIG. 3 is a flowchart illustrating a first exemplary embodiment, describing a procedure for giving tactile sensation feedback to an image.

FIG. 4A illustrates a display example of a screen for selecting a recording format to be used in an image capturing operation.

FIG. 4B illustrates information about correspondence between recording formats and tactile sensations.

FIG. 4C illustrates a display example of the screen that displays captured images in a list in the playback mode.

FIG. 6B illustrates information about correspondence between GPS settings and tactile sensations.

DESCRIPTION OF THE EMBODIMENTS

Figure 5:
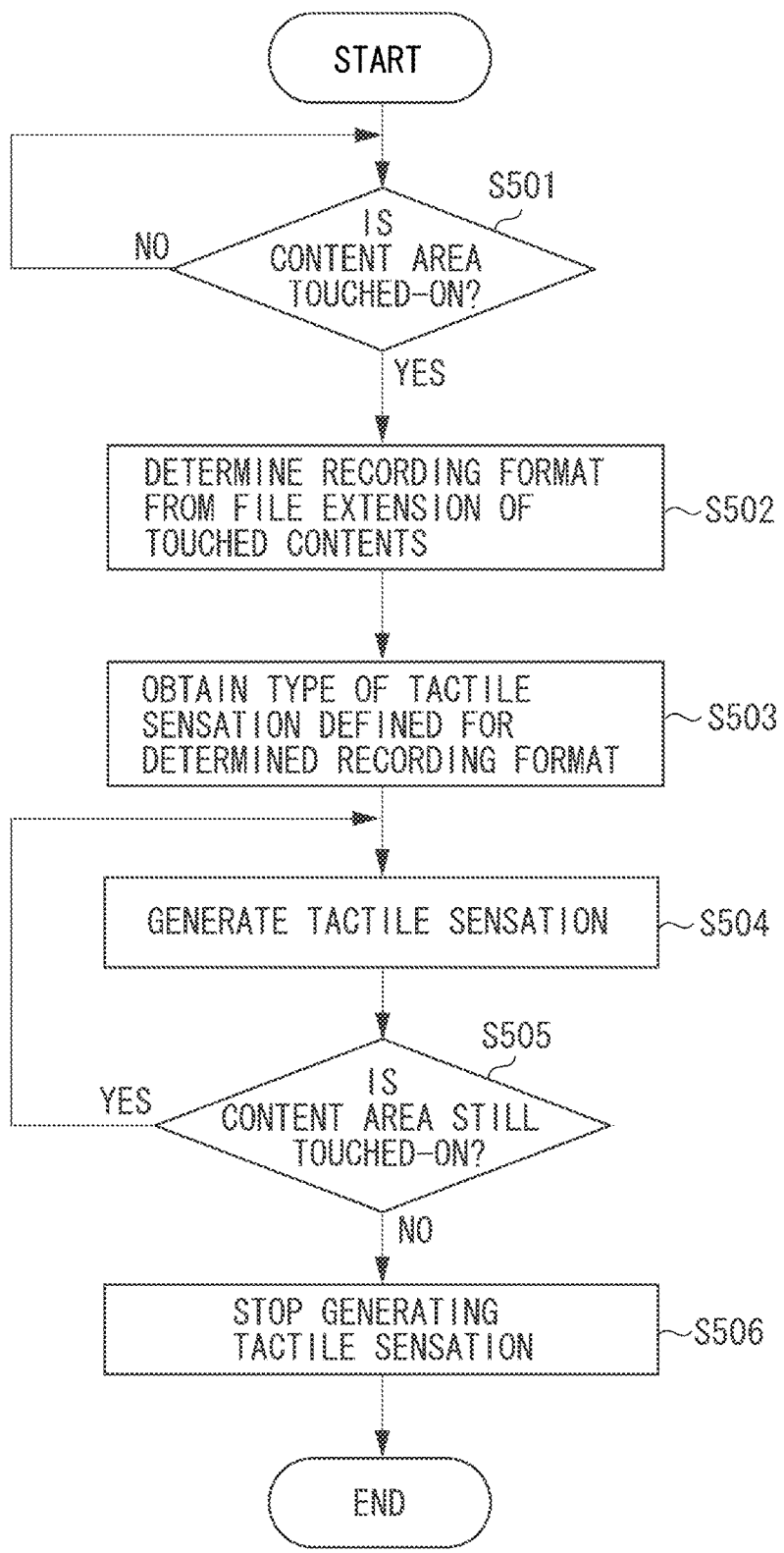
FIG. 5 is a flowchart illustrating a second exemplary embodiment, describing a procedure for giving tactile sensation feedback to an image.

An exemplary embodiment of the present disclosure will be described in detail below with reference to the accompanying drawings. It is to be noted that the following exemplary embodiment is merely one example for implementing the present disclosure and can be appropriately modified or changed depending on individual constructions and various conditions of apparatuses to which the present disclosure is applied. Thus, the present disclosure is in no way limited to the following exemplary embodiment.

Various exemplary embodiments, features, and aspects of the disclosure will be described in detail below with reference to the drawings.

FIG. 1 is a block diagram illustrating a configuration example of a display control apparatus 100 which is an electronic apparatus according to the present exemplary embodiment. The display control apparatus 100 of the present exemplary embodiment can be constituted by using a personal computer (PC).

As illustrated in FIG. 1, the display control apparatus 100 includes a central processing unit (CPU) 101, a memory 102, a nonvolatile memory 103, an image processing unit 104, a display 105, an operation unit 106, a recording medium interface (I/F) 107, an external I/F 109, and a communication I/F 110 which are connected to an internal bus 150. In the present exemplary embodiment, a system timer 112, a tactile sensation generation unit 113, and an imaging unit 114 are also connected to the internal bus 150. The components connected to the internal bus 150 can exchange data with each other via the internal bus 150. As used herein, the term "unit" generally refers to any combination of software, firmware, hardware, or other component that is used to effectuate a purpose.

An example of the memory 102 is a random access memory (RAM) (a volatile memory using a semiconductor device or devices). The CPU 101 uses the memory 102 as a work memory and controls the components of the display control unit 100 according to a program which is stored, for example, in the nonvolatile memory 103. The nonvolatile memory 103 stores image data, audio data, and other data, and various programs for the CPU 101 to operate with. Examples of the nonvolatile memory 103 include a hard disk (HD) and a read-only memory (ROM).

The image processing unit 104 applies various types of image processing to image data and video signals based on control of the CPU 101. The image data and the video signals include image data stored in the nonvolatile memory 103 and a recording medium 108, a video signal obtained via the external I/F 109, and image data obtained via the communication I/F 110. The image processing unit 104 performs the image processing including analog-to-digital (A/D) conversion processing, digital-to-analog (D/A) conversion processing, image data coding processing, compression processing, decoding processing, enlargement/reduction processing (resizing), noise reduction processing, and color conversion processing.

The image processing unit 104 may include a dedicated circuit block or blocks for performing specific image processing. Depending on the type of image processing, the CPU 101 may perform the image processing according to a program without using the image processing unit 104.

The display 105 displays images and a graphical user interface (GUI) screen for implementing a GUI based on the control of the CPU 101. The CPU 101 controls the components of the display control apparatus 100 to generate a display control signal according to a program, generate a video signal to be displayed on the display 105, and output the video signal to the display 105. The display 105 displays a video image based on the input video signal. The display control apparatus 100 itself may include only components up to the interface for outputting the video signal to be displayed on the display 105. In such a case, the display 105 may be constituted as an external monitor (television set).

The operation unit 106 is an input device for accepting user operations. The operation unit 106 may include a text information input device such as a keyboard, a pointing device such as a mouse and a touch panel 106a, a button(s), a dial(s), a joystick(s), a touch sensor(s), and/or a touch pad. The touch panel 106a is an input device formed in a planar configuration, stacked on the display 105. The touch panel 106a is configured to output coordinate information according to a touched position.

The recording medium I/F 107 is an interface into which a recording medium 108 such as a memory card, a compact disc (CD), and a digital versatile disc (DVD) can be loaded. The recording medium I/F 107 is used to read data from the loaded recording medium 108 and/or write data to the recording medium 108 based on the control of the CPU 101. The external I/F 109 is an interface for connecting to an external device by a wired cable or in a wireless manner to input and output a video signal and an audio signal.

The communication I/F 110 is an interface for communicating with an external device and/or the Internet 111 to transmit and receive various types of data including files and commands. The system timer 112 is a time measurement unit that measures time to be used for various controls and the time of a built-in clock.

The CPU 101 can detect the following operations and states of the touch panel 106a.

The touch panel 106a having been untouched is touched with a finger or pen. In other words, the start of a touch (hereinafter, referred to as a touch-down).

The touch panel 106a is being touched with a finger or pen (hereinafter, referred to as a touch-on).

A finger or pen is moving while touching the touch panel 106a (hereinafter, referred to as a touch-move).

A finger or pen having touched the touch panel 106a is released (hereinafter, referred to as a touch-up).

The touch panel 106a is not touched with anything (hereinafter, referred to as a touch-off).

Two points are simultaneously touched-on and the distance between the two touched points decreases (hereinafter, referred to as a pinch-in).

Two points are simultaneously touched-on and the distance between the two touched points increases (hereinafter, referred to as a pinch-out).

Making touch-downs and touch-ups on a plurality of points will be referred to as a multi-touch-down and a multi-touch-on, respectively. Operations on a plurality of points will be referred to as a multi-touch. Touch-on on a plurality of points will be referred to as a multi-touch-on.

Such operations and position coordinates where the touch panel 106a is touched with the finger(s) or pen are notified to the CPU 101 through the internal bus 150. Based on the notified information, the CPU 101 determines what operation has been made on the touch panel 106a.

For a touch-move, the CPU 101 can determine the moving direction of the finger or pen moving on the touch panel 106a in terms of both vertical and horizontal components on the touch panel 106a based on a change in the position coordinates. If a touch-down on the touch panel 106a is followed by a certain touch-move and a touch-up, the CPU 101 determines that a stroke was drawn. An operation of quickly drawing a stroke is referred to as a flick.

A flick is an operation of quickly moving a finger, touching the touch panel 106a over a certain distance and immediately releasing the finger. In other words, a flick is an operation of quickly sweeping over the touch panel 106a as if flicking with the finger. If the CPU 101 detects a touch-move over a predetermined distance or more at a predetermined speed or higher and immediately detects a touch-up, the CPU 101 can determine that a flick was made.

If the CPU 101 detects a touch-move over a predetermined distance or more at below a predetermined speed, the CPU 101 determines that a drag was made. The touch panel 106a may be any of touch panels using various methods including a resistive film method, a capacitance method, a surface acoustic wave method, an infrared method, an electromagnetic induction method, an image recognition method, and an optical sensor method.

The tactile sensation generation unit 113 is a device that generates tactile sensations for giving a tactile sensation stimulus to the user's finger touching the touch panel 106a. The tactile sensation generation unit 113 may employ either one, both, or a combination of a vibration tactile sensation generation method and an electrical tactile sensation generation method.

According to the vibration tactile sensation generation method, eccentric motors or piezoelectric elements (which correspond to the tactile sensation generation unit 113) are arranged on top, bottom, left, right, and center portions of a rear surface of the display 105 (touch panel 106*a*). Electrical currents are caused to pass through the motors or voltages are applied to the piezoelectric elements to vibrate the operation unit 106 portion by portion of the display 105.

The CPU 101 can control the currents to pass though the motors or the voltages to be applied to the piezoelectric elements to generate various vibrations having different amplitudes and/or frequencies in the respective portions. The CPU 101 can thereby give various tactile sensations to the user's hand touching the touch panel 106*a*.

The tactile sensation generation unit 113 using the electrical tactile sensation generation method includes a conductive layer panel and an insulator panel. The conductive layer panel can be charged with positive charges. The two panels are formed in a planar configuration, stacking on the display 105 like the touch panel 106*a*. When the user touches the insulator panel, the positive charges of the conductive layer panel can give an electrosensory stimulus to the user.

Further, by a Coulomb force, the tactile sensation generation unit 113 can also give a sensation as if the user's skin is being pulled. Whether to charge the conductive layer panel with positive charges can be selected with respect to each position of the conductive layer panel. The CPU 101 can control the selection to give a "grainy sensation" and a "lumpy sensation (tactile sensation rougher than grainy)" to an object touching the touch panel 106*a*, such as the user's finger.

Charging the conductive layer panel with positive charges position by position can give tactile sensations locally, instead of over the entire location touched. Positions to give tactile sensations within one touched area can also be changed. In such a manner, various tactile sensations can be given to the user.

Exemplary embodiments feasible by using the foregoing hardware configuration will be described below. Note that a third exemplary embodiment described below further includes a communication unit for performing telephone communications and a position information obtaining unit for obtaining GPS information from GPS satellites in addition to the hardware configuration of FIG. 1.

A first exemplary embodiment will be described. In the first exemplary embodiment, in a digital camera practicing an exemplary embodiment of the present disclosure, control for giving tactile sensation feedback to an image by using bit rate information is described with reference to FIGS. 2A to 2C. FIG. 2A is a diagram illustrating a screen displayed on the display 105 for selecting a bit rate to be used in an image capturing operation. The screen is displayed by opening a bit rate selection screen from a capturing setting menu before the capturing of a moving image.

Five bit rate types including MXP (approximately 24 Mbps), FXP (approximately 17 Mbps), XP+ (approximately 12 Mbps), SP (approximately 7 Mbps), and LP (approximately 5 Mbps) are displayed as selection items. Recording pixels also vary with the bit rate type. For MXP and FXP, moving image recording pixels are 1920×1080 pixels. For the other types, moving image recording pixels are 1440×1080 pixels.

The nonvolatile memory 103 stores tactile sensation feedback information when the display areas of the respective selection items (five bit rate setting icons at the bottom of the screen) being touched. Specifically, the nonvolatile memory 103 stores information about correspondence between the bit rates and tactile sensations, where a smooth sensation (high), a smooth sensation (low), no tactile sensations, a grainy sensation (low), and a grainy sensation (high) are defined in advance as illustrated in FIG. 2B.

If the bit rate setting icons are touched, the CPU 101 controls the tactile sensation generation unit 113 to give the defined tactile sensations according to the touched area. If any of the five bit rate setting icons at the bottom of the screen is tapped, the CPU 101 sets the bit rate of the tapped bit rate setting icon as the recording bit rate of a moving image in a moving image capturing operation.

FIG. 2C is a diagram illustrating a screen that displays captured images in a list in a playback mode. In FIG. 2C, an image 201 is an image captured at the bit rate SP. An image 202 is an image captured at the bit rate MXP.

If the image 201 is touched, the tactile sensation generation unit 113 gives the same grainy tactile sensation (low) as that of the selection item SP in FIG. 2A. If the image 202 is touched, the tactile sensation generation unit 113 gives the same smooth tactile sensation (high) as that of the selection item MXP in FIG. 2A. As a result, the user can recognize the capturing bit rates when touching the images.

In the digital camera practicing an exemplary embodiment of the present disclosure, a flowchart of the control for giving tactile sensation feedback to an image by using the bit rate information will be described with reference to FIG. 3. Such processing is performed by the CPU 101 loading a program recorded in the nonvolatile memory 103 into the memory 102 and executing the program.

In step S301, the CPU 101 determines whether a position in the touch panel 106*a* corresponding to an image display area (content area) on a content screen for displaying content is touched-on. The CPU 101 performs touch detection in which if the user made a touch-down on the content area or a touch-move from a touched area outside the content area into the content area, the content area is determined to be touched-on. If the content area is determined to be touched-on (YES in step S301), the CPU 101 proceeds to step S302. If not (NO in step S301), the CPU 101 waits in step S301.

In step S302, the CPU 101 identifies the image (content) based on the touched coordinates, and obtains the bit rate information attached to the image from meta data on the identified image. Obtaining the bit rate information, the CPU 101 proceeds to step S303.

In step S303, the CPU 101 refers to the information about correspondence between the bit rates and the tactile sensations stored in the nonvolatile memory 103, and obtains the type (pattern) of the tactile sensation defined for the bit rate information obtained in step S302.

In step S304, the CPU 101 transmits information for generating the tactile sensation of the type obtained in step S303 to the tactile sensation generation unit 113. The CPU 101 thereby causes the tactile sensation generation unit 113 to generate the tactile sensation of the type obtained in step S303. The tactile sensation generation unit 113 may generate the tactile sensation on the entire touch panel 106*a*. If the tactile sensation generation unit 113 can locally generate tactile sensations, the tactile sensation generation unit 113 may generate the tactile sensation only within the touched content area.

In step S305, the CPU 101 determines whether the image display area (content area) identified in step S302 is still touched-on. If the user made a touch-up from the content area or a touch-move out of the content area, the CPU 101 determines that the content area is no longer touched-on. If the content area is still touched-on (YES in step S305), the CPU 101 returns to step S304 to continue generating the tactile sensation. If the content area is determined not to be touched-on (NO in step S305), the CPU 101 proceeds to step S306. In step S306, the CPU 101 causes the tactile sensation generation unit 113 to stop generating the tactile sensation. The CPU 101 then ends the processing.

The foregoing flowchart has dealt with the case where the tactile sensation generation unit 113 generates a tactile sensation if a content area is touched-on. Alternatively, if the tactile sensation generation unit 113 can simultaneously generate different tactile sensations on different portions of the touch panel 106a, the tactile sensation generation unit 113 may generate the tactile sensations corresponding to the bit rates of the content in the respective content areas before a touch.

According to the first exemplary embodiment, the user who touches content on the content list screen during playback can feel the tactile sensations that he/she has once experienced on the setting screen before recording the content. The user can thus recognize the meaning of the tactile sensations he/she felt when touching the content, and recognize the details of the meta data on the content from the tactile sensations.

A second exemplary embodiment will be described. In the digital camera practicing an exemplary embodiment of the present disclosure, the first exemplary embodiment has dealt with the control for giving tactile sensation feedback to an image by using the bit rate information. In contrast, the present exemplary embodiment deals with control for giving tactile sensation feedback to an image by using recording format information in the digital camera practicing an exemplary embodiment of the present disclosure.

FIG. 4A is a diagram illustrating a screen displayed on the display 105 for selecting a recording format to be used in an image capturing operation. The screen is displayed by opening a recording format selection screen from a capturing setting menu before the capturing of a moving image.

As illustrated in FIG. 4A, setting items for specifying setting details to be set, including recording format types Advanced Video Coding High Definition (AVCHD), Moving Picture Expert Group-4 (MP4), and still image, are displayed as content items (setting options). FIG. 4B illustrates tactile sensation feedback information when the display areas of the respective items (three recording format setting icons at the bottom of the screen) is being touched. The nonvolatile memory 103 stores information about correspondence between the recording formats and tactile sensations, where a smooth sensation, no tactile sensations, and a grainy sensation are defined in advance as illustrated in FIG. 4B.

If the setting icons are touched, the CPU 101 controls the tactile sensation generation unit 113 to give the defined tactile sensations according to the touched area. If any of the three recording format setting icons at the bottom of the screen is tapped, the CPU 101 sets the recording format of the tapped setting icon as the recording format of an image capturing operation.

FIG. 4C is a diagram illustrating a screen that displays captured images in a list in a playback mode. In FIG. 4C, an image 401 is an image captured in the AVCHD format. An image 402 is an image captured in the MP4 format. If the user made a touch-down on the image 401, the tactile sensation generation unit 113 gives the same smooth tactile sensation as that of the setting item AVCHD in FIG. 4A. If the user made a touch-down on the image 402, the tactile sensation generation unit 113 gives the same grainy tactile sensation as that of the setting item MP4 in FIG. 4A. As a result, the user can recognize the recording format when making a touch-down on an image.

A flowchart of the control for giving tactile sensation feedback to an image by using the recording format information in the digital camera practicing an exemplary embodiment of the present disclosure will be described with reference to FIG. 5. Such processing is performed by the CPU 101 loading a program recorded in the nonvolatile memory 103 into the memory 102 and executing the program.

In step S501, the CPU 101 determines whether a position in the touch panel 106a corresponding to an image display area (content area) is touched-on. The CPU 101 performs touch detection in which if the user made a touch-down on the content area or a touch-move from a touched area outside the content area into the content area, the content area is determined to be touched-on. If the content area is determined to be touched-on (YES in step S501), the CPU 101 proceeds to step S502. If not (NO in step S501), the CPU 101 waits in step S501.

In step S502, the CPU 101 identifies the image (content) based on the touched coordinates, and determines the recording format of the content from a file extension of the identified image. Determining the recording format, the CPU 101 proceeds to step S503.

In step S503, the CPU 101 refers to the information about correspondence between the recording formats and the tactile sensations stored in the nonvolatile memory 103, and obtains the type of the tactile sensation defined for the recording format determined in step S502.

In step S504, the CPU 101 transmits information for generating the tactile sensation of the type obtained in step S503 to the tactile sensation generation unit 113. The CPU 101 thereby causes the tactile sensation generation unit 113 to generate the tactile sensation of the type obtained in step S503. The tactile sensation generation unit 113 may generate the tactile sensation either on the entire touch panel 106a or locally. If the tactile sensation generation unit 113 can locally generate tactile sensations, the tactile sensation generation unit 113 may generate the tactile sensation only within the touched content area.

In step S505, the CPU 101 determines whether the image display area (content area) identified in step S502 is still touched-on. If the user made a touch-up from the content area or a touch-move out of the content area, the CPU 101 determines that the content area is no longer touched-on. If the content area is still touched-on (YES in step S505), the CPU 101 returns to step S504 to continue generating the tactile sensation. If the content area is determined not to be touched-on (NO in step S505), the CPU 101 proceeds to step S506. In step S506, the CPU 101 causes the tactile sensation generation unit 113 to stop generating the tactile sensation. The CPU 101 then ends the processing.

The foregoing flowchart has dealt with the case where the tactile sensation generation unit 113 generates a tactile sensation if a content area is touched-on. Alternatively, if the tactile sensation generation unit 113 can simultaneously generate different tactile sensations on different portions of the touch panel 106a, the tactile sensation generation unit 113 may generate the tactile sensations according to the recording formats of the content in the respective content areas before a touch.

Further, a plurality of pieces of information about touched content may be notified by tactile sensations. For example, the bit rate and the recording format of the content both may be notified of by tactile sensations as in the first exemplary embodiment and the second exemplary embodiment, respectively. In such a case, the tactile sensation generation unit 113 alternately generates the tactile sensations defined for the respective setting states while the content area is touched.

Even in the second exemplary embodiment, the user who touches the content on the content list screen during playback can feel the tactile sensations that he/she has once experienced on the setting screen before recording the content. The user can thus recognize the meaning of the tactile sensations he/she felt when touching the content, and recognize the details of the meta data on the content from the tactile sensations.

A third exemplary embodiment will be described. The first and second exemplary embodiments have dealt with the control for giving tactile sensation feedback to an image in the digital camera practicing an exemplary embodiment of the present disclosure. In contrast, the present exemplary embodiment deals with control for giving tactile sensation feedback to an activation icon of application software (hereinafter, referred to application) that can use GPS information in a mobile phone terminal practicing an exemplary embodiment of the present disclosure.

Figure 6A:
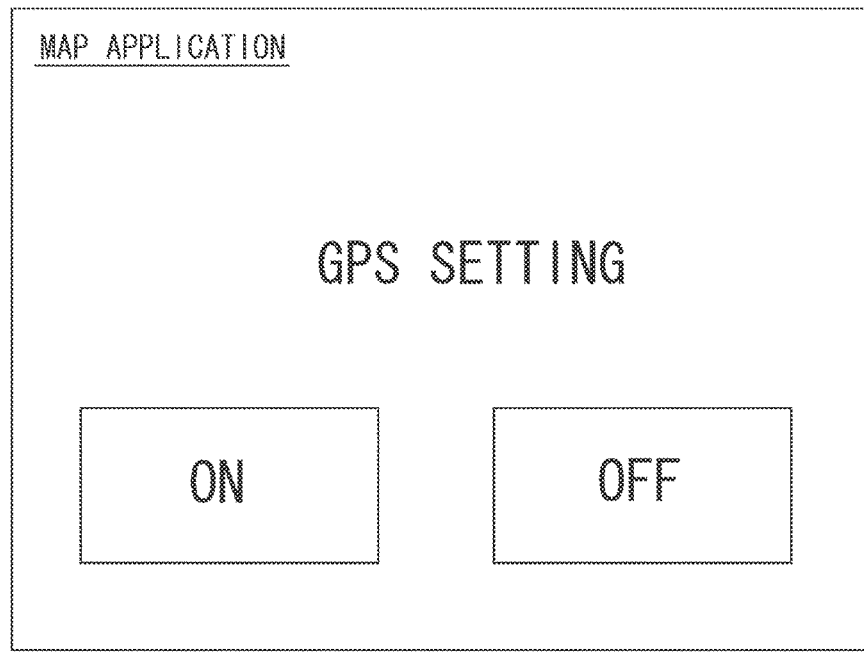
FIG. 6A illustrates a display example of a screen for selecting whether to turn ON or OFF a Global Positioning System (GPS) function of a map application.

FIG. 6A is a diagram illustrating a screen for selecting whether to turn ON or OFF a GPS function of a map application. The GPS function can be either turned ON or OFF. The nonvolatile memory 103 stores tactile sensation feedback information when the display areas (ON and OFF buttons at the bottom of the screen) of the respective items are touched. As the tactic sensation feedback information, the nonvolatile memory 103 stores information about correspondence between GPS settings in which no tactile sensations and a grainy sensation are defined in advance and tactile sensations as illustrated in FIG. 6B.

If the buttons are touched, the CPU 101 controls the tactile sensation generation unit 113 to give the defined tactile sensations according to the touched buttons. If either one of the two buttons at the bottom of the screen is tapped, the CPU 101 sets the GPS setting of the target map application to be ON (use GPS position information) or OFF (use no GPS position information) according to the tapped button. The CPU 101 can make similar settings for each application using GPS information. In the present exemplary embodiment, the CPU 101 can also set whether a telephone application, a mail application, and a calendar application each use the GPS position information.

Figure 6C:
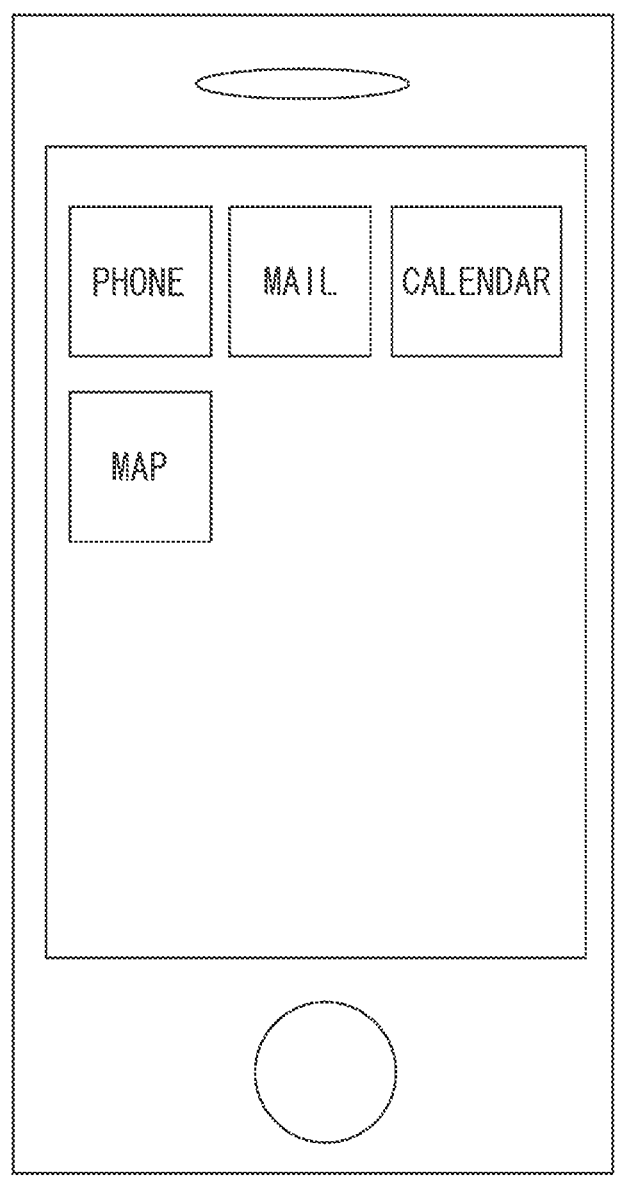
FIG. 6C illustrates a display example of an application list screen.

FIG. 6C is a diagram illustrating a display example of an application list screen on the display 105. The application list screen is intended for the user to activate an arbitrary application. If the user touches the map application software in FIG. 6C, the tactile sensation generation unit 113 gives the user a tactile sensation depending on the setting state of the GPS function described in FIG. 6A. If the GPS function is ON, the tactile sensation generation unit 113 gives no tactile sensations. If the GPS function is OFF, the tactile sensation generation unit 113 gives a grainy tactile sensation. As a result, the user can recognize the setting state of the GPS function when touching the activation icon of the map application. In other words, the user can recognize the GPS setting of the map application without activating the map application.

Next, a flowchart of the control for giving tactile sensation feedback to an activation icon of application software using GPS information in the mobile phone terminal practicing an exemplary embodiment of the present disclosure will be described with reference to FIG. 7. Such processing is performed by the CPU 101 loading a program recorded in the nonvolatile memory 13 into the memory 102 and executing the program.

In step S701, the CPU 101 determines whether a position in the touch panel 106a corresponding to an image display area (application icon) of any one of the application activation icons is touched-on. The CPU 101 performs touch detection in which if the user made a touch-down on an application icon or a touch-move from a touched area outside the application icon into the application icon, the application icon is determined to be touched-on. If an application icon is determined to be touched-on (YES in step S701), the CPU 101 proceeds to step S702. If not (NO in step S701), the CPU 101 waits in step S701.

In step S702, the CPU 101 identifies the application software based on the touched coordinates. If the application software is determined to be a specific piece of application software that can use GPS information (for example, the map application), the CPU 101 determines the GPS setting state of the application. Determining the GPS setting state, the CPU 101 proceeds to step S703.

In step S703, the CPU 101 refers to the information about correspondence between the GPS settings and the tactile sensations stored in the nonvolatile memory 103, and obtains the type of the tactile sensation defined for the GPS setting state determined in step S702.

In step S704, the CPU 101 transmits information for generating the tactile sensation of the type obtained in step S703 to the tactile sensation generation unit 113. The CPU 101 thereby causes the tactile sensation generation unit 113 to generate the tactile sensation of the type obtained in step S703. The tactile sensation generation unit 113 may generate the tactile sensation on the entire touch panel 106a. If the tactile sensation generation unit 113 can locally generate tactile sensations, the tactile sensation generation unit 113 may generate the tactile sensation only within the touched application icon.

In step S705, the CPU 101 determines whether the application icon identified in step S702 is still touched-on. If the user made a touch-up from the application icon or a touch-move out of the application icon, the CPU 101 determines that the application icon is no longer touched-on. If the application icon is still touched-on (YES in step S705), the CPU 101 returns to step S704 to continue generating the tactile sensation. If the application icon is determined not to be touched-on (NO in step S705), the CPU 101 proceeds to step S706. In step S706, the CPU 101 causes the tactile sensation generation unit 113 to stop generating the tactile sensation. The CPU 101 then ends the processing.

The foregoing flowchart has dealt with the case where the tactile sensation generation unit 113 generates a tactile sensation if an application icon is touched-on. If the tactile sensation generation unit 113 can simultaneously generate different tactile sensations on different portions of the touch panel 106a, the tactile sensation generation unit 113 may generate the tactile sensations corresponding to the GPS settings of the applications of the respective application icons before a touch.

The foregoing example has dealt with the GPS settings. However, the settings are not limited to the GPS settings as long as the same tactile sensations are fed back when the user makes a setting and when the user touches an application icon. The present exemplary embodiment may be similarly practiced with other setting details as long as they are concerning applications. Further, setting states about a plurality of setting options (for example, that the GPS setting is ON and that a telephone directory reference function is ON) may be notified by tactile sensations. In such a case, the tactile sensation generation unit 113 alternately generates the tactile sensations defined for the respective setting states while the application icon is touched.

According to the third exemplary embodiment, the user who touches the application icons on the application icon list screen can feel the tactile sensations that he/she has once experienced on the setting screens of the applications. The user can thus recognize the meaning of the tactile sensations he/she felt when touching the application icons, and recognize the setting states of the applications from the tactile sensations.

The foregoing exemplary embodiment is not limited to the applications and may be applied to when notifying of the setting state of a specific function by tactile sensations. For example, when the user touches a display area for executing a function, the tactile sensation generation unit 113 generates the same tactile sensation as that of a touch area for making a setting about the function on a setting screen of the function. In such a case, the user can recognize the current setting state of the function from the tactile sensation he/she felt when touching the display area for executing the function.

For example, if the user touches a self-timer button for activating a self-timer shooting function when performing a capturing operation, the tactile sensation generation unit 113 generates tactile sensations according to the set self-timer speed. Here, the tactile sensation generation unit 113 generates the same tactile sensations as those given when respective speed setting buttons are touched on a screen for setting the self-timer speed. In such a case, the user can recognize how many seconds the current self-timer speed of the self-time capturing operation is set to from the tactile sensation he/she felt when touching the self-timer button.

The foregoing first and second exemplary embodiments have dealt with the cases where the bit rate and the recording format are used as the setting items. A frame rate at which a moving image or video image is processed per unit time may be used.

Figure 7:
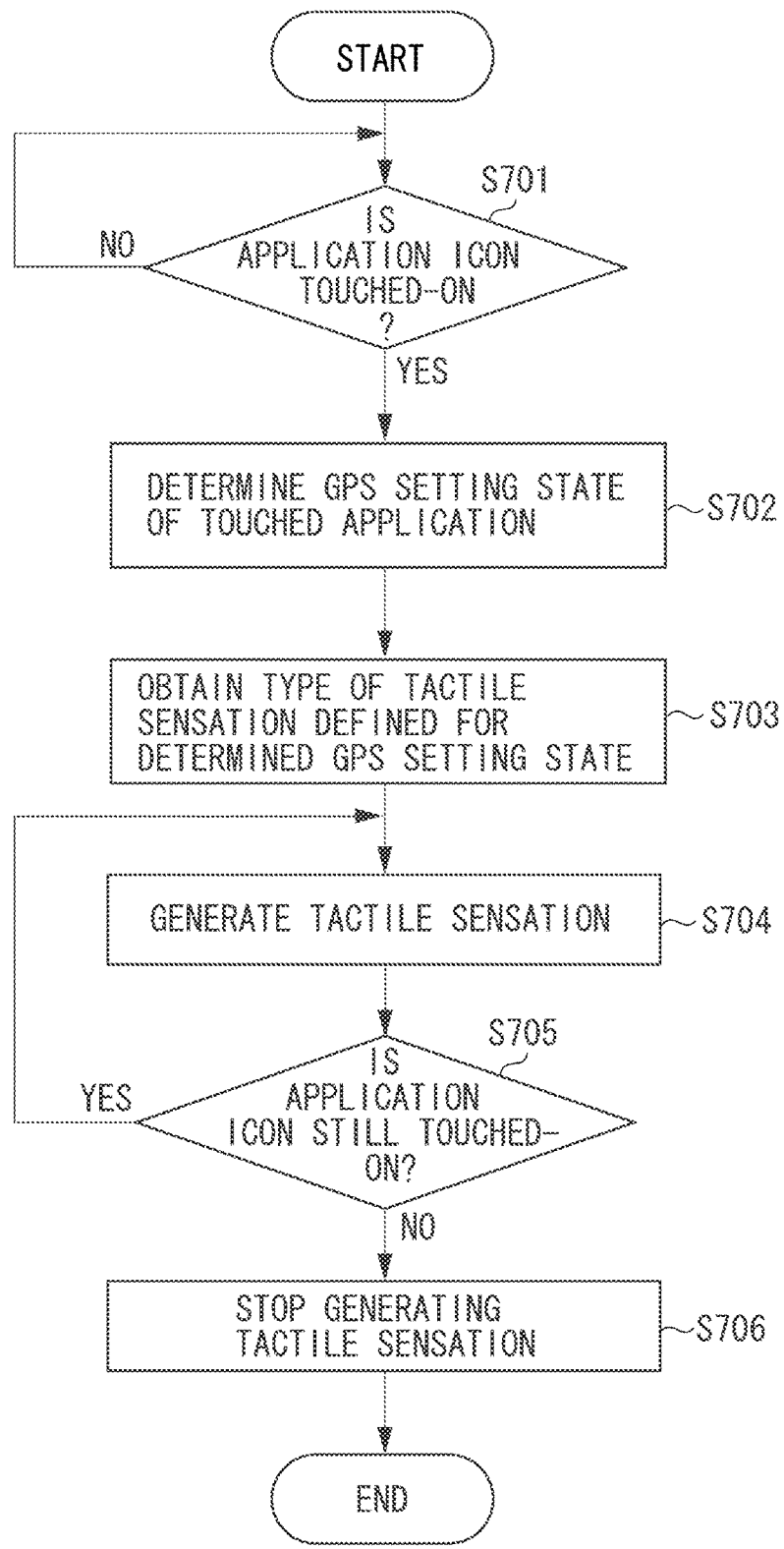
FIG. 7 is a flowchart illustrating a third exemplary embodiment, describing a control procedure for giving tactile sensation feedback to an application icon.

The control of the foregoing flowcharts of FIGS. 3, 5, and 7 may be performed by a single piece of hardware. Alternatively, a plurality of pieces of hardware may share the processing to control the entire apparatus.

Up to this point, the present disclosure has been described in detail in conjunction with suitable exemplary embodiments thereof. The present disclosure is not limited to such specific exemplary embodiments, and various modes not departing from the gist of the present disclosure are also embraced in the present disclosure. The foregoing exemplary embodiments may be partly combined according to need.

Exemplary embodiments of the present disclosure are applicable to touch input-capable display control apparatuses. More specifically, exemplary embodiments of the present disclosure may be applied to a personal computer, a personal digital assistant (PDA), a mobile phone terminal, a portable image viewer, a printer apparatus including a display, a digital photo frame, a music player, a game machine, and an electronic book reader.

Other Embodiments

Aspects of the present disclosure can also be realized by a computer of a system or apparatus (or devices such as a CPU, a micro processing unit (MPU), and/or the like) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., a computer-readable non-transitory storage medium).

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority from Japanese Patent Application No. 2012-208711 filed Sep. 21, 2012, which is hereby incorporated by reference herein in its entirety.

What is claimed is:

1. An electronic apparatus comprising a memory and at least one processor which function as:
   a touch detection unit configured to detect a touch on a display unit;
   a tactile sensation generation unit configured to generate tactile sensations to be given to an object touching the display unit;
   an imaging unit configured to capture content;
   a display control unit configured to control the display unit to display a setting item for specifying a tactile feedback setting detail and for setting detail to be set about content on a setting screen for making a setting about content based on meta data before capturing of the content by the imaging unit, wherein the content comprises at least an image, capture of the image, and display a content item representing the captured image on a content screen; and
   a control unit configured to control the tactile sensation generation unit to give the object touching the setting item on the setting screen a tactile sensation according to the touched setting item, and give the object touching the content item on the content screen the same tactile sensation as that given when the setting item for specifying the tactile feedback setting detail set for the touched contents is touched,
   wherein the tactile sensation according to the touched setting item occurs when the object touches the setting item on the setting screen, and
   wherein the tactile sensation generation unit can simultaneously generate different tactile sensations on different portions of the display unit based on multiple touches on the different portions.

2. The electronic apparatus according to claim 1, wherein the tactile sensation generation unit is configured to generate tactile sensations according to recording formats of the content.

3. The electronic apparatus according to claim 1, wherein the setting screen is a setting screen for setting about capturing of the image, the setting screen being displayed before the capturing of the image, and wherein the setting item is displayed as a setting option for the setting about the capturing of the image.

4. The electronic apparatus according to claim 3, wherein the setting item is a setting option about at least one of a bit rate, a frame rate, and a recording format.

5. The electronic apparatus according to claim 1, wherein the electronic apparatus is one of at least a computer, a camera, a mobile phone terminal, an image viewer, a PDA (personal digital assistant), a printer, a photo frame, a music player, and an electronic book reader.

6. The electronic apparatus according to claim 1, further comprising application software, and
wherein the content item is an icon representing the application software.

7. The electronic apparatus according to claim 6, further comprising an obtaining unit configured to obtain position information about the electronic apparatus,
wherein the application software includes a function of performing control using the position information, and
wherein the setting item is an item for setting whether the application software uses the function of performing control using the position information.

8. The electronic apparatus according to claim 7, wherein the position information is information obtained from a GPS (Global Positioning System) satellite.

9. The electronic apparatus according to claim 7, wherein the application software is a map application.

10. The electronic apparatus according to claim 1,
wherein the content item is a self-timer button for activating a self-timer shooting operation, and
wherein the setting item is a time setting button displayed as an alternative on a screen for setting a self-timer time.

11. The electronic apparatus according to claim 1, wherein the object is a finger of a user.

12. The electronic apparatus according to claim 1, wherein the tactile sensation generation unit is configured to generate vibrations.

13. The electronic apparatus according to claim 1, wherein the tactile sensation generation unit is configured to generate an electrosensory stimulus.

14. A method for controlling an electronic apparatus comprising:
detecting a touch on a display unit;
generating tactile sensations to be given to an object touching the display unit;
capturing content by an imaging unit;
controlling the display unit to display a setting item for specifying a tactile feedback setting detail and for setting detail to be set about content on a setting screen for making a setting about content based on meta data before capturing of the content by the imaging unit, wherein the content comprises at least an image, capture of the image, and display a content item representing the captured image on a content screen; and
controlling the generating of the tactile sensations to give the object touching the setting item on the setting screen a tactile sensation according to the touched setting item, and controlling the generating of the tactile sensations to give the object touching the content item on the content screen the same tactile sensation as that given when the setting item for specifying the tactile feedback setting detail set for the touched contents is touched,
wherein the tactile sensation according to the touched setting item occurs when the object touches the setting item on the setting screen, and
wherein the generating can simultaneously generate different tactile sensations on different portions of the display unit based on multiple touches on the different portions.

15. A computer-readable non-transitory storage medium storing a program for causing a computer to perform operations comprising:
detecting a touch on a display unit;
generating tactile sensations to be given to an object touching the display unit;
capturing content by an imaging unit;
controlling the display unit to display a setting item for specifying a tactile feedback setting detail and for setting detail to be set about content on a setting screen for making a setting about content based on meta data before capturing of the content by the imaging unit, wherein the content comprises at least an image, capture of the image, and display a content item representing the captured image on a content screen; and
controlling the generating of the tactile sensations to give the object touching the setting item on the setting screen a tactile sensation according to the touched setting item, and controlling the generating of the tactile sensations to give the object touching the content item on the content screen the same tactile sensation as that given when the setting item for specifying the tactile feedback setting detail set for the touched contents is touched,
wherein the tactile sensation according to the touched setting item occurs when the object touches the setting item on the setting screen, and
wherein the generating can simultaneously generate different tactile sensations on different portions of the display unit based on multiple touches on the different portions.

16. An electronic apparatus comprising a memory and at least one processor which function as:
a touch detection unit configured to detect a touch on a display unit;
a feedback generation unit configured to give feedback to a user according to the touch on the display unit;
an imaging unit configured to capture content;
a display control unit configured to control the display unit to display a setting item for specifying a tactile feedback setting detail and for setting detail to be set about content on a setting screen for making a setting about content based on meta data before capturing of the content by the imaging unit, wherein the content comprises at least an image, capture of the image, and display a content item representing the captured image on a content screen; and
a control unit configured to control the feedback generation unit to give the user touching the setting item on the setting screen feedback according to the touched setting item, and control the feedback generation unit to give the user touching the content item on the content screen the same feedback as that given when the setting item for specifying the tactile feedback setting detail set for the touched contents is touched,
wherein the tactile feedback according to the touched setting item occurs when the object touches the setting item on the setting screen, and
wherein the feedback generation unit can simultaneously generate different types of feedback on different portions of the display unit based on multiple touches on the different portions.

17. A method for controlling an electronic apparatus including a touch detection unit configured to detect a touch on a display unit, an imaging unit configured to capture content, and a feedback generation unit configured to give feedback to a user according to the touch on the display unit, the method comprising:
controlling the display unit to display a setting item for specifying a tactile feedback setting detail and for setting detail to be set about content on a setting screen for making a setting about content based on meta data before capturing of the content by the imaging unit, wherein the content comprises at least a moving image, capture of the image, and display a content item representing the captured image on a content screen; and controlling the feedback generation unit to give the user touching the setting item on the setting screen feedback according to the touched setting item, and controlling the feedback generation unit to give the user touching the content item on the content screen the feedback as that given when the setting item for specifying the tactile feedback setting detail set for the touched contents is touched, wherein the tactile feedback according to the touched setting item occurs when the user touches the setting item on the setting screen, and wherein the feedback generation unit can simultaneously generate different feedback on different portions of the display unit based on multiple touches on the different portions.

18. A computer-readable non-transitory recording medium storing a program for causing a computer including a touch detection unit configured to detect a touch on a display unit, an imaging unit configured to capture content, and a feedback generation unit configured to give feedback to a user according to the touch on the display unit to perform operations comprising:

controlling the display unit to display a setting item for specifying a tactile feedback setting detail and for setting detail to be set about content on a setting screen for making a setting about content based on meta data before capturing of the content by the imaging unit, wherein the content comprises at least an image, capture of the image, and display a content item representing the captured image on a content screen; and controlling the feedback generation unit to give the user touching the setting item on the setting screen feedback according to the touched setting item, and controlling the feedback generation unit to give the user touching the content item on the content screen the same feedback as that given when the setting item for specifying the tactile feedback setting item set for the touched contents is touched, wherein the tactile feedback according to the touched setting item occurs when the user touches the setting item on the setting screen, and wherein the feedback generation unit can simultaneously generate different feedback on different portions of the display unit based on multiple touches on the different portions.

19. An electronic apparatus comprising a memory and at least one processor which function as:

a touch detection unit configured to detect a touch on a display unit;

a tactile sensation generation unit configured to generate tactile sensations to be given to an object touching the display unit;

an imaging unit configured to capture content;

a display control unit configured to control the display unit to display a setting item for specifying a tactile feedback setting detail and for setting a detail to be set about a content on a setting screen for making a setting about a content based on meta data before capturing of the content by the imaging unit, wherein the content comprises at least an image, capture of the image, and display a content item representing the captured image on a content screen; and a control unit configured to control the tactile sensation generation unit to give the object touching the setting item on the setting screen a tactile sensation corresponding to the touched setting item, and give the object touching the content item on the content screen the same tactile sensation as that given when the setting item for specifying the tactile feedback setting detail set for the touched contents is touched, wherein the tactile sensation generation unit can simultaneously generate different tactile sensations on different portions of the display unit based on multiple touches on the different portions, and wherein the tactile sensation generation unit generates the tactile sensations corresponding to the touched setting item before the object touches the setting item on the setting screen.

* * * * *